United States Patent Office 2,907,764
Patented Oct. 6, 1959

2,907,764

HETEROCYCLIC ESTERS OF 3,4,5-TRIMETHOXYBENZOIC ACID

Walter Voegtli, Evanston, and Richard A. Robinson, Morton Grove, Ill., assignors to G. D. Searle & Co., Chicago, Ill., a corporation of Delaware No Drawing. Application July 30, 1956
Serial No. 600,665

6 Claims. (Cl. 260—268)

The present invention relates to basic, heterocyclic esters of 3,4,5-trimethoxybenzoic acid and nontoxic salts thereof. It is specifically concerned with esters which, in the forms of their free bases, have the structural formula

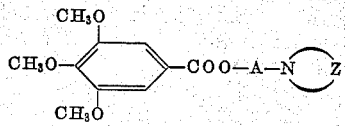

wherein A is a lower alkylene radical separating the groups attached thereto by at least two carbon atoms and

is a saturated, monocyclic, heterocyclic radical selected from the class consisting of piperidino, pyrrolidino, piperazino, lower alkyl substitution products thereof, and radicals of the structural formula

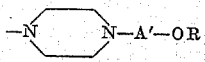

wherein A′ is a lower alkylene radical separating the groups attached thereto by at least two carbon atoms and R is hydrogen, a lower alkyl radical or a lower alkanoyl radical.

This application is a continuation-in-part of our co-pending application Serial No. 536,281, filed September 23, 1955, now abandoned.

In the foregoing structural formulas the terms A and A′ can represent polymethylene radicals such as ethylene, trimethylene, tetramethylene, pentamethylene, or hexamethylene. They can also represent one of the radicals isomeric therewith, such as propylene, butylene, amylene, or hexylene. The common feature of these radicals is that they interpose at least two carbon atoms between the groups to which they are attached. The radical

can represent piperidino, lower alkylated piperidino, pyrrolidino, lower alkylated pyrrolidino, piperazino, lower alkylated piperazino, and lower hydroxyalkylated piperazino and ethers and esters thereof, but it does not include heterocyclic radicals containing a nuclear hetero atom other than nitrogen.

In one of the methods for the manufacture of esters of this invention, 3,4,5-trimethoxybenzoic acid is heated with a piperidinoalkyl halide or a pyrrolidinoalkyl halide, whereby an ester of the desired constitution is obtained. Thus, heating a solution of trimethoxybenzoic acid and 2,6-dimethylpiperidinoethyl chloride in chloroform solution affords 2,6-dimethylpiperidinoethyl trimethoxybenzoate hydrochloride. This compound can be converted to the free base or to other salts by procedures described herein.

In a second method for the manufacture of esters of this invention, a haloalkyl ester of trimethoxybenzoic acid is condensed with piperidine, pyrrolidine, piperazine, or a suitable alkylated derivative thereof. Thus, condensation of 2-bromoethyl 3,4,5-trimethoxybenzoate with piperazine, followed by conversion of the initial reaction product to the free base, affords piperazinoethyl trimethoxybenzoate.

In a third method for the manufacture of esters of this invention, 3,4,5-trimethoxybenzoyl chloride is esterified with a suitable alcohol. Reaction with piperidinoethanol and conversion of the initial reaction product to the free base, for example, yields piperidinoethyl trimethoxybenzoate.

In a fourth method for the manufacture of esters of this invention, a piperazinoalkyl trimethoxybenzoate is treated with an alkylating reagent such as an alkyl halide or a mixture of formic acid and formaldehyde; with a hydroxyalkylating reagent, representatively an alkylene halohydrin such as ethylene bromohydrin or propylene chlorohydrin; or with an alkoxyalkylating reagent such as 1-bromo-2-ethoxyethane or 1-bromo-3-methoxypropane; with the formation of the corresponding N-alkyl, N-hydroxyalkyl or N-alkoxyalkyl substitution product. Esters are obtained by reaction of the N-hydroxyalkyl derivatives with acylating reagents such as lower alkanoic acid anhydrides in pyridine solution. Depending upon the acylating reagent employed, when R in the foregoing structural formula is an alkanoyl radical, it can be chosen from among formyl, acetyl, propionyl, butyryl, valeryl, hexanoyl, heptanoyl, octanoyl, and branched-chain isomers thereof, the foregoing being lower alkanoyl radicals having fewer than 9 carbon atoms.

The organic bases described herein form non-toxic salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Such esters can be selected from among methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The compounds of this invention have valuable pharmacological properties. They are, for example, potent anticholinergic agents and are useful for relaxing spasms of the hollow viscera. They are also antihypertensive agents. The compounds of this invention, in particular those which are quaternary ammonium salts, have the property of blocking the transmission of nerve impulses across the autonomic ganglia, and because of this property are valuable in the treatment of ulcers and other gastrointestinal dysfunctions associated with autonomic hyperactivity. The heterocyclic esters of this invention are more potent therapeutic agents than the lower dialkylaminoalkyl esters of 3,4,5-trimethoxybenzoic acid, in particular exhibiting an increased ganglion blocking activity.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.) and quantities of materials in parts by weight.

Example 1

A suspension of 21.4 parts of 3,4,5-trimethoxybenzoic acid in 112 parts of chloroform is mixed with 17.7 parts of 2,6-dimethylpiperidinoethyl chloride. Over a period of 2-3 hours, the resulting clear solution is distilled at atmospheric pressure in a nitrogen atmosphere until almost all of the chloroform has been removed. The remaining oil is dissolved in ice water, and the aqueous solution is extracted with 2 portions of ether. This ethereal extract is discarded. The cold aqueous phase is made basic by the addition of potassium carbonate and is extracted with ether. This ethereal extract is washed with water and concentrated to dryness. Traces of remaining solvent are removed by heating the residue in a vacuum at 80° C. for 3 hours. In this way there is obtained a crystallizate of 2,6-dimethylpiperidinoethyl trimethoxybenzoate. This free base has the structural formula

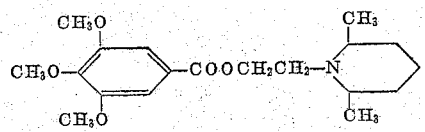

Example 2

To a solution of 12 parts of 2,6-dimethylpiperidinoethyl trimethoxybenzoate in 80 parts of acetone there is added a slight excess over one molecular equivalent of hydrogen chloride in isopropyl alcohol. After crystallization begins, the reaction mixture is gradually diluted with ether. The precipitated product is collected on a filter and washed with ether. For purification a filtered solution of this crude product in 400 parts of acetone is diluted with 350 parts of ether, and the solution is seeded. When crystallization is complete, the product is collected on a filter and washed with mixtures of acetone and ether. There is thus obtained 2,6-dimethylpiperidinoethyl trimethoxybenzoate hydrochloride melting at 184-185° C.

Example 3

A solution of 8 parts of 2,6-dimethylpiperidinoethyl trimethoxybenzoate, 120 parts of chloroform and 10 parts of methyl bromide is placed in a closed reaction vessel and maintained at about 60° C. for 16 hours. The solution is then cooled and diluted with ether. When crystallization of the initially-oily precipitate is complete, it is collected on a filter and washed with ether. This product is purified by recrystallization from a mixture of chloroform and butanone to yield 2,6-dimethylpiperidinoethyl trimethoxybenzoate methobromide melting at 167-171° C.

Example 4

By the procedure of Example 3, with the substitution of 14 parts of methyl iodide for the methyl bromide, there is obtained 2,6-dimethylpiperidinoethyl trimethoxybenzoate methiodide.

Example 5

A solution of 8 parts of 2,6-dimethylpiperidinoethyl trimethoxybenzoate, 120 parts of chloroform and 6 parts of methyl chloride is placed in a sealed reaction vessel and maintained at about 100° C. for 8 hours. The solution is then cooled and diluted with ether. When separation of the product is complete, it is collected and washed with ether. Purification by recrystallization from a mixture of chloroform and butanone affords 2,6-dimethylpiperidinoethyl trimethoxybenzoate methochloride.

Example 6

A mixture of 18.4 parts of 3,4,5-trimethoxybenzoic acid and 14 parts of 2,5-dimethylpyrrolidinoethyl chloride in 105 parts of chloroform is distilled at atmospheric pressure in a nitrogen atmosphere until almost all of the chloroform has been removed. This operation is carried out over a period of 2-3 hours. The remaining oil is dissolved in ice water, and the aqueous solution is extracted with two portions of ether. This ethereal extract is discarded. The cold, aqueous phase is made basic by the addition of potassium carbonate and is extracted with ether. This ethereal extract is washed with water and concentrated to dryness. The residual oil consists substantially of 2,5-dimethylpyrrolidinoethyl trimethoxybenzoate. This free base has the structural formula

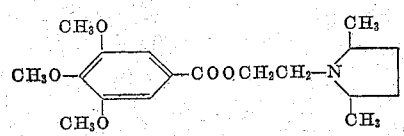

Example 7

To a solution of 9.2 parts of 2,5-dimethylpyrrolidinoethyl trimethoxybenzoate in 12 parts of anhydrous ethanol there is added a slight excess over one molecular equivalent of hydrogen chloride in isopropyl alcohol. Crystallization may begin spontaneously; if not, it is induced by adding ether and scratching the walls of the reaction vessel. The mixture is then diluted with additional ether and allowed to stand until crystallization is complete. The product is collected on a filter and washed with ether. For purification it is recrystallized from a mixture of butanone and ether. There is thus obtained 2,5-dimethylpyrrolidinoethyl trimethoxybenzoate hydrochloride melting with decomposition at 166-168° C.

Example 8

By the procedure of Example 7, with the substitution of hydrogen bromide in isopropyl alcohol for the hydrogen chloride in isopropyl alcohol, there is obtained 2,5-dimethylpyrrolidinoethyl trimethoxybenzoate hydrobromide.

Example 9

A mixture of 4.6 parts of 2,5-dimethylpyrrolidinoethyl trimethoxybenzoate, 38 parts of butanone and 5.2 parts of methyl bromide is placed in a closed reaction vessel which is heated at about 60° C. for 48 hours. The entire contents of the reaction vessel are dissolved with chloroform, and the volatile solvents are removed by distillation in a nitrogen atmosphere. A solution of the remaining, dark red oil in acetone is partially decolorized with activated charcoal and filtered. A crude, oily, quaternary ammonium salt is precipitated by dilution of the filtrate with ether, and this precipitate is rendered crystalline by digesting it with a small amount of acetone. The crystalline product is collected on a filter and washed with acetone and with ether. Purification by recrystallization from a mixture of butanone and ether affords 2,5-dimethylpyrrolidinoethyl trimethoxybenzoate methobromide melting at 140-141° C.

Example 10

A solution of 25 parts of 3,4,5-trimethoxybenzoic acid and 65 parts of thionyl chloride is maintained at about 60° C. for 2 hours and is then allowed to stand at room temperature for 16 hours. The thionyl chloride is removed by distillation under reduced pressure. Small portions of benzene are added to the residue and removed by distillation under reduced pressure. A solution of the residue in 27 parts of anhydrous benzene is diluted with petroleum ether, whereupon a crystalline precipitate of 3,4,5-trimethoxybenzoyl chloride separates. This acid chloride is collected on a filter and washed with petroleum ether. A solution of 21 parts of this compound and 12.5 parts of ethylene bromohydrin in 88 parts of anhydrous benzene is heated under reflux for 7 hours and allowed to stand at room temperature for 48 hours. The reaction mixture is diluted with ether and washed with ice water, with several portions of cold, saturated sodium bicarbonate solution, and with several portions of ice water. The ethereal phase is separated, dried and concentrated in a nitrogen atmosphere. Crystallization of the residue from petroleum ether affords 2-bromoethyl 3,4,5-trimethoxybenzoate melting at 63–65° C.

A mixture of 15 parts of 2-bromoethyl 3,4,5-trimethoxybenzoate, 12 parts of piperazine and 140 parts of butanone is heated under reflux for 4 hours. Insoluble piperazine hydrobromide is removed by filtration, after which most of the butanone is removed by distillation in a nitrogen atmosphere. The residue is partitioned with benzene and dilute hydrochloric acid. The aqueous phase is chilled and stirred with solid potassium carbonate until no more will dissolve, causing the gradual separation of an oily product. This is extracted with several portions of benzene and chloroform. The combined organic extract is separated and concentrated to dryness in a nitrogen atmosphere. The residual oily product consists substantially of piperazinoethyl trimethoxybenzoate. This free base has the structural formula

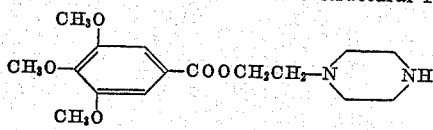

Example 11

To a solution of 2.1 parts of piperazinoethyl trimethoxybenzoate in 16 parts of absolute ethanol there is added a slight excess of over two molecular equivalents of hydrogen chloride in isopropyl alcohol. The solution is diluted with 80 parts of acetone and, when crystallization is complete, the product is collected on a filter and washed with acetone and with ether. An additional quantity of product is obtained by further dilution of the crystallization liquor with ether. Purification by recrystallization from a mixture of methanol, acetone and ether affords piperazinoethyl trimethoxybenzoate dihydrochloride hemihydrate melting at 205–206° C. (heated rapidly or inserted in preheated bath).

Example 12

Over a period of 2–3 hours, a mixture of 21.2 parts of 3,4,5-trimethoxybenzoic acid, 112 parts of chloroform and 16.5 parts of piperidinopropyl chloride is distilled at atmospheric pressure in a nitrogen atmosphere until almost all of the chloroform has been removed as a distillate. The remaining oil is dissolved in ice water, and the aqueous solution is extracted with 2 portions of ether. The ethereal extract is discarded. The cold aqueous phase is made basic by the addition of potassium carbonate and is extracted with ether. This ethereal extract is washed wtih water and concentrated to dryness, yielding a residue of piperidinopropyl trimethoxybenzoate. This free base has the structural formula

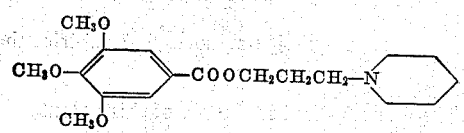

Example 13

A solution of 3.5 parts of piperidinopropyl trimethoxybenzoate, 60 parts of chloroform and 5 parts of methyl bromide is placed in a closed reaction vessel and maintained at about 60° C. for 20 hours. The solution is then cooled and diluted with ether. When precipitation of the product is complete, it is collected and washed with ether. Purification by recrystallization from a mixture of chloroform and butanone affords piperidinopropyl trimethoxybenzoate methobromide.

Example 14

A solution of 20 parts of 3,4,5-trimethoxybenzoyl chloride, 110 parts of anhydrous benzene and 18 parts of 6-bromo-1-hexanol is heated under reflux for 16 hours. The cooled reaction mixture is diluted with ether and washed with ice water, with several portions of cold, saturated sodium bicarbonate solution, and finally with several portions of ice water. The organic phase is separated and concentrated to dryness in a nitrogen atmosphere. The residue, which consists substantially of 6-bromohexyl trimethoxybenzoate, is washed with petroleum ether. A mixture of this product, 15 parts of pyrrolidine and 200 parts of butanone is heated under reflux for 5 hours. Most of the butanone is then removed by distillation in a nitrogen atmosphere. The reaction mixture is partioned with benzene and dilute hydrochloric acid. The aqueous phase is then chilled and stirred with solid potassium carbonate until no more will dissolve. The oil which separates is rapidly extracted with several portions of benzene and chloroform, and the combined organic extract is washed with water and concentrated to dryness, yielding a residue of pyrrolidino-hexyl trimethoxybenzoate. This free base has the structural formula

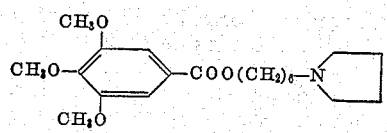

This compound is converted to a water-soluble hydrochloride by dissolving it in ethanol and adding a slight excess over one molecular equivalent of hydrogen chloride in isopropyl alcohol. A good yield of the hydrochloride is obtained by diluting this reaction mixture with ether.

Example 15

A mixture of 1.2 parts of piperazinoethyl trimethoxybenzoate, 6 parts of formic acid and 5 parts of an aqueous solution of formaldehyde containing 35–40% of formaldehyde is heated at 90–100° C. for 3 hours, after which it is cooled and poured into ice water. Solid potassium carbonate is added until the mixture is distinctly basic, and the precipitated product is extracted with chloroform. The chloroform extract is washed with several portions of cold water and concentrated to dryness in a nitrogen atmosphere, yielding a residue of 4-methylpiperazinoethyl trimethoxybenzoate. This free base has the structural formula

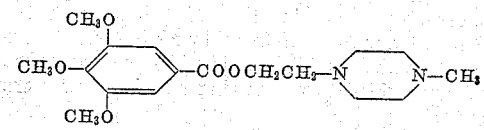

This compound is converted to a water-soluble dihydrochloride by dissolving it in ethanol and adding a slight excess over two molecular equivalents of hydrogen chloride in isopropyl alcohol. A good yield of the dihydrochloride is obtained by diluting this reaction mixture with ether.

Example 16

A solution of 1 part of 4-methylpiperazinoethyl trimethoxybenzoate in a minimum quantity of acetone is poured into a solution of 1 part of oxalic acid in 20 parts of water. The mixture is diluted with additional acetone, and after precipitation of the product is complete, it is collected on a filter and washed with acetone and with ether. Purification by recrystallization from acetone containing a small amount of water affords 4-methylpiperazinoethyl trimethoxybenzoate dioxalate melting at 217.5–218° C.

Example 17

Piperazinoethyl trimethoxybenzoate is prepared by dissolving the dihydrochloride of Example 11 in a minimum quantity of ice water, rendering the mixture basic by the addition of potassium carbonate, rapidly extracting with several small portions of chloroform, and recovering the free base by vaporizing the chloroform from the separated organic phase. A stirred mixture of 15 parts of piperazinoethyl trimethoxybenzoate, 6 parts of ethylene bromohydrin, 6.5 parts of potassium carbonate and 220 parts of anhydrous benzene is heated under reflux for 14 hours. The cooled reaction mixture is washed with cold water, dried, filtered and concentrated to about 40% of its original volume, after which it is diluted with 100 parts of absolute ether. The carbon disulfide-addition complex of unreacted starting material is precipitated by the addition of 12 parts of carbon disulfide and removed by filtration. The filtrate is concentrated by vaporization of the solvents, affording a residue of crude N-(β-hydroxyethyl)piperazinoethyl trimethoxybenzoate of the structural formula

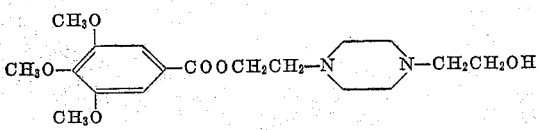

This crude product dissolved in 50 parts of hot ethanol is poured into a hot solution of 20 parts of maleic acid in 50 parts of ethanol. Crystallization is induced, and the insoluble product is collected on a filter. By recrystallization from ethanol there is obtained purified N-(β-hydroxyethyl)piperazinoethyl trimethoxybenzoate dimaleate which melts with decomposition at about 153–155° C.

Example 18

N-(β-hydroxyethyl)piperazinoethyl trimethoxybenzoate dimaleate of Example 17 is converted to the free base by dissolving it in a minimum quantity of ice water, rendering the mixture basic with potassium carbonate, extracting with several small portions of chloroform, and vaporizing the volatile solvent from the separated organic extract. N-(β-hydroxyethyl)piperazinoethyl trimethoxybenzoate (3.6 parts) is dissolved in 30 parts of pyridine and 16 parts of acetic anhydride, and the reaction mixture is allowed to stand at about 25° C. for 48 hours, after which the pyridine and acetic anhydride are removed by distillation under reduced pressure. The residue is stirred with ice cold, saturated potassium carbonate solution, and the resulting suspension is extracted with several portions of chloroform. The crude product, N-(β-acetoxyethyl)piperazinoethyl trimethoxybenzoate, obtained by vaporization of the chloroform from the separated organic phase, is dissolved in 8 parts of hot, absolute ethanol and added to a refluxing solution of 5 parts of maleic acid in 12 parts of absolute ethanol. When crystallization is complete, the insoluble product is collected on a filter and washed with cold ethanol and with ether. This compound is N-(β-acetoxyethyl)piperazinoethyl trimethoxybenzoate dimaleate which melts with decomposition at about 170–171° C.

Example 19

By the procedure of Example 18, with the substitution of 12 parts of propionic anhydride for the acetic anhydride, there is obtained N-(β-propionoxyethyl)piperazinoethyl trimethoxybenzoate. This compound is converted into a water-soluble dimaleate by admixture of a hot ethanolic solution with a refluxing solution of maleic acid in ethanol.

Example 20

A stirred mixture of 7.9 parts of piperazinoethyl trimethoxybenzoate, 4.1 parts of 1-bromo-2-ethoxyethane, 3.7 parts of potassium carbonate and 130 parts of anhydrous benzene is heated under reflux for 10 hours and then allowed to stand at about 25° C. for 60 hours. The reaction mixture is diluted with an additional 90 parts of benzene and washed with small portions of water, after which it is dried, filtered and concentrated by the removal of about 150 parts of benzene as a distillate. The remaining solution is diluted with 70 parts of anhydrous ether, after which 25 parts of carbon disulfide is added. The carbon disulfide-addition complex of the starting material crystallizes and is removed by filtration. The filtrate is concentrated to dryness, affording a residue of crude N-(β-ethoxyethyl)piperazinoethyl trimethoxybenzoate of the structural formula

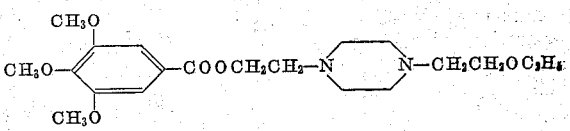

A hot solution of this crude product in 20 parts of ethanol is poured into a hot solution of 8 parts of maleic acid in 20 parts of ethanol. Crystallization is induced, and the separated product is collected on a filter and washed with cold ethanol and with ether. This compound is N-(β-ethoxyethyl)piperazinoethyl trimethoxybenzoate dimaleate which melts at about 162–163° C.

Example 21

By the procedure of Example 20, with the substitution of 4.1 parts of 1-bromo-3-methoxypropane for the 1-bromo-2-ethoxyethane, there is obtained N-(γ-methoxypropyl)piperazinoethyl trimethoxybenzoate. This compound yields a water-soluble salt by treatment of an ethereal solution with hydrogen chloride.

What is claimed is:
1. A compound of the structural formula

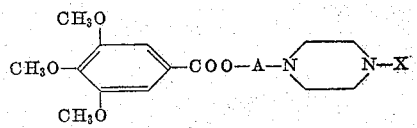

wherein A is a lower alkylene radical separating the groups attached thereto by at least two carbon atoms and X is selected from the group consisting of hydrogen, lower alkyl radicals, and radicals of the formula

—A′—OR wherein A′ is a lower alkylene radical separating the groups attached thereto by at least two carbon atoms and R is selected from the group consisting of hydrogen and lower alkyl and lower alkanoyl radicals.

2. Piperazinoethyl 3,4,5-trimethoxybenzoate.
3. 4-methylpiperazinoethyl 3,4,5-trimethoxybenzoate.
4. N-(β-hydroxyethyl)piperazinoethyl 3,4,5-trimethoxybenzoate.
5. N-(β-acetoxyethyl)piperazinoethyl 3,4,5-trimethoxybenzoate.
6. N-(β-ethoxyethyl)piperazinoethyl 3,4,5-trimethoxybenzoate.

References Cited in the file of this patent

UNITED STATES PATENTS 2,824,874     Schlittler _____ Feb. 25, 1958

OTHER REFERENCES

Schlittler et al.: Annals of New York Acad. of Science, vol. 59, pp. 1–7 (1954).
Rohmann et al.: Archiv der Pharmazie, vol. 278, pp. 425–437 (1940).
Chemical Abstracts, vol. 43, p. 1023 (1949).